(12) United States Patent
Choi et al.

(10) Patent No.: US 8,119,307 B2
(45) Date of Patent: *Feb. 21, 2012

(54) ELECTRODE FOR FUEL CELL, METHOD OF MANUFACTURING THE ELECTRODE, AND FUEL CELL EMPLOYING THE ELECTRODE

(75) Inventors: Seong-woo Choi, Yongin-si (KR); Jung-ock Park, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1191 days.

This patent is subject to a terminal disclaimer.

(21) Appl. No.: 11/856,350

(22) Filed: Sep. 17, 2007

(65) Prior Publication Data

US 2008/0145743 A1     Jun. 19, 2008

(30) Foreign Application Priority Data

Dec. 15, 2006 (KR) .................. 10-2006-0128943

(51) Int. Cl.
*H01M 4/02* (2006.01)

(52) U.S. Cl. ........ 429/524; 429/525; 429/526; 429/527; 429/523; 429/400; 427/115

(58) Field of Classification Search .................. 429/524, 429/525, 526, 527, 523, 400; 427/115
See application file for complete search history.

(56) References Cited

U.S. PATENT DOCUMENTS

| | | | |
|---|---|---|---|
| 5,525,436 A | 6/1996 | Savinell et al. | |
| 2008/0020264 A1* | 1/2008 | Sun et al. | 429/41 |
| 2008/0118817 A1 | 5/2008 | Lee et al. | |

FOREIGN PATENT DOCUMENTS

| | | |
|---|---|---|
| EP | 1 760 110 | 3/2007 |
| EP | 1 881 549 | 1/2008 |
| JP | 5-283082 | 10/1993 |
| JP | 11-503262 | 3/1999 |
| JP | 11-097011 | 4/1999 |
| WO | WO 96/13872 | 5/1996 |

OTHER PUBLICATIONS

U.S. Appl. No. 11/514,254, filed Sep. 1, 2006, Seong-woo Choi et al., Samsung Electronics Co., Ltd.
U.S. Appl. No. 11/514,831, filed Sep. 5, 2006, Myung-jin Lee et al., Samsung Electronics Co., Ltd.
U.S. Appl. No. 11/743,778, filed May 3, 2007, Seong-woo Choi et al., Samsung Electronics Co., Ltd.
U.S. Appl. No. 12/262,854, filed Oct. 31, 2008, Seong-woo Choi et al., Samsung Electronics Co., Ltd.
U.S. Appl. No. 12/247,338, filed Oct. 8, 2008, Seong-woo Choi et al., Samsung Electronics Co., Ltd.
U.S. Appl. No. 12/208,664, filed Sep. 11, 2008, Seong-woo Choi et al., Samsung Electronics Co., Ltd.
U.S. Appl. No. 12/263,011, filed Oct. 31, 2008, Seong-woo Choi et al., Samsung Electronics Co., Ltd.
U.S. Appl. No. 11/947,011, filed Nov. 29, 2007, Seong-woo Choi et al., Samsung Electronics Co., Ltd.
U.S. Appl. No. 12/266,039, filed Nov. 6, 2008, Seong-woo Choi et al., Samsung Electronics Co., Ltd.
U.S. Appl. No. 12/208,492, filed Sep. 11, 2008, Seong-woo Choi et al., Samsung Electronics Co., Ltd.
U.S. Appl. No. 11/765,033, filed Jun. 19, 2007, Hee-young Sung et al., Samsung Electronics Co., Ltd.
U.S. Appl. No. 11/765,056, filed Jun. 19, 2007, Kyung-jung Kwon et al., Samsung Electronics Co., Ltd.
Search Report issued in European Patent Application No. 08157494.9 on Nov. 24, 2008.
Office Action issued by the Patent Office of the People's Republic of China on Feb. 27, 2009.

* cited by examiner

*Primary Examiner* — Laura Weiner
(74) *Attorney, Agent, or Firm* — Lee & Morse, P.C.

(57) ABSTRACT

An electrode for a fuel cell, the electrode including a catalyst layer, a method of making the same, and a fuel cell including the electrode. The catalyst layer includes a catalyst and at least one selected from the group consisting a first benzoxazine monomer, represented by Formula 1 below, a second benzoxazine monomer represented by Formula 2 below, a combination thereof, a homopolymer consisting of the first benzoxazine monomer, a homopolymer consisting of the second benzoxazine monomer, and a copolymer consisting of the first and second benzoxazine monomers. The electrode the first and/or second benzoxazine monomers contain fluorine or a fluorine-containing functional group.

Formula 1:

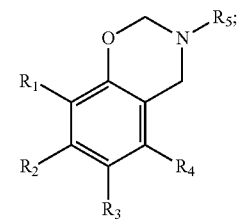

Formula 2:

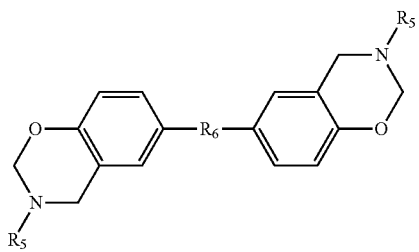

20 Claims, 2 Drawing Sheets

ELECTRODE FOR FUEL CELL, METHOD OF MANUFACTURING THE ELECTRODE, AND FUEL CELL EMPLOYING THE ELECTRODE

CROSS-REFERENCE TO RELATED APPLICATIONS

This application claims the benefit Korean Application No. 2006-128943, filed Dec. 15, 2006, in the Korean Intellectual Property Office, the disclosure of which is incorporated herein by reference.

BACKGROUND OF THE INVENTION

1. Field of the Invention

Aspects of the present invention relate to an electrode for a fuel cell and a fuel cell employing the same.

2. Description of the Related Art

Fuel cells employing a polymer electrolyte membrane as an electrolyte can be operated at a relatively low temperature and can be manufactured in small sizes. Fuel cells are expected to be used as power sources for electrical automobiles or household distributed power systems. A perfluorocarbonsulfonate polymer membrane, represented as NAFION (trade name), has been used as a polymer electrolyte membrane in polymer electrolyte membrane fuel cells.

However, such a polymer electrolyte membrane must be humidified for proton conduction. Moreover, in order to increase the efficiency of a fuel cell system, a polymer electrolyte membrane fuel cell must be operated at a high temperature, for example, a temperature of 100° C. or more. However, water is evaporated from an electrolyte membrane at high temperatures, and thus, an electrolyte membrane loses functionality as a solid electrolyte.

In view of the above problem, non-humidified electrolyte membranes that can be operated under non-humidifying conditions, at high temperatures of 100° C. or more have been developed. For example, Japanese Patent Laid-Open Publication No. Hei. 11-503262 discloses phosphoric acid-doped polybenzimidazole or the like, which is used as a material for a non-humidified electrolyte membrane.

In low temperature perfluorocarbonsulfonate polymer electrolyte membrane fuel cells, in order to prevent defective gas diffusion in an electrode (in particular in a cathode), which may be caused by water (product water) generated during electric power production in the electrode, hydrophobic electrodes including polytetrafluoroethylene (PTFE) have been used (e.g., Japanese Patent Laid-Open Publication No. Hei. 05-283082). In high temperature (150-200° C.) phosphoric acid fuel cells, liquid phosphoric acid is used as an electrolyte. However, a large quantity of the liquid phosphoric acid is present at an electrode, thereby hindering gas diffusion. Thus, an electrode that has a layer of water-repellent PTFE that is capable of preventing the blocking of micropores, due to phosphoric acid, has been proposed.

In fuel cells employing a phosphoric acid-impregnated polybenzimidazole (PBI) electrolyte membrane, as a high-temperature, non-humidified electrolyte, in order to promote contact between an electrode and an electrolyte membrane, attempts have been made to impregnate an electrode with liquid phosphoric acid and to load a larger quantity of a metal catalyst. However, the power output characteristics of such fuel cells may not be satisfactory, and thus, there is much room for improvement.

In phosphoric acid-doped solid polymer electrolyte fuel cells, the supply of air to a cathode requires an aging time of about one week, even when using an optimal electrode composition. Although it is possible to improve the performance of the cathode and to reduce the aging time, by replacing the air of the cathode with oxygen, these fuel cells may not be commercially available.

SUMMARY OF THE INVENTION

Aspects of the present invention provide an electrode for a fuel cell. The electrode shows better oxygen permeability when air is used in a cathode, better wettability in phosphoric acid, and good resistance to heat and phosphoric acid. Aspects of the present invention relate to a method of manufacturing the electrode, and a fuel cell employing the electrode.

According to aspects of the present invention, there is provided an electrode including a catalyst layer for a fuel cell. The catalyst layer includes a catalyst and at least one selected from the group consisting of: a first benzoxazine monomer represented by Formula 1 below and a second benzoxazine monomer represented by Formula 2 below; a mixture thereof, a homopolymer consisting of the first benzoxazine monomer, a homopolymer consisting of the second benzoxazine monomer, and a copolymer consisting of the first and second benzoxazine monomers.

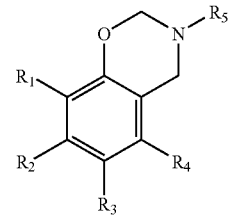

<Formula 1>

In Formula 1:

$R_1$, $R_2$, $R_3$, and $R_4$ are each independently selected from hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, or a cyano group;

$R_5$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and at least one of $R_1$, $R_2$, $R_3$, $R_4$, and $R_5$ is fluorine or a fluorine-containing functional group.

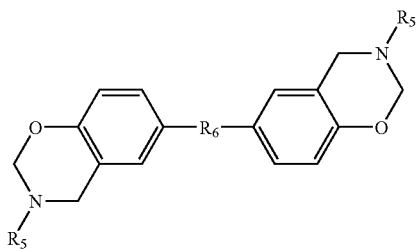

<Formula 2>

In Formula 2:

$R_5$ is selected from the group consisting of a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, and a substituted or unsubstituted C2-C20 heterocyclic alkyl group;

$R_6$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—; and at least one of $R_5$ and $R_6$ is fluorine or a fluorine-containing functional group.

According to aspects of the present invention, there is provided a method of manufacturing an electrode for a fuel cell, the method including: dispersing a catalyst in a solvent to obtain a dispersion solution; adding a mixture including a solvent and at least one of a first benzoxazine monomer represented by Formula 1 and a second benzoxazine monomer represented by Formula 2, to the dispersion solution, followed by stirring, to obtain a coating solution; and coating the coating solution onto a surface of a carbon support.

According to another aspect of the present invention, there is provided a fuel cell including the above-described electrode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
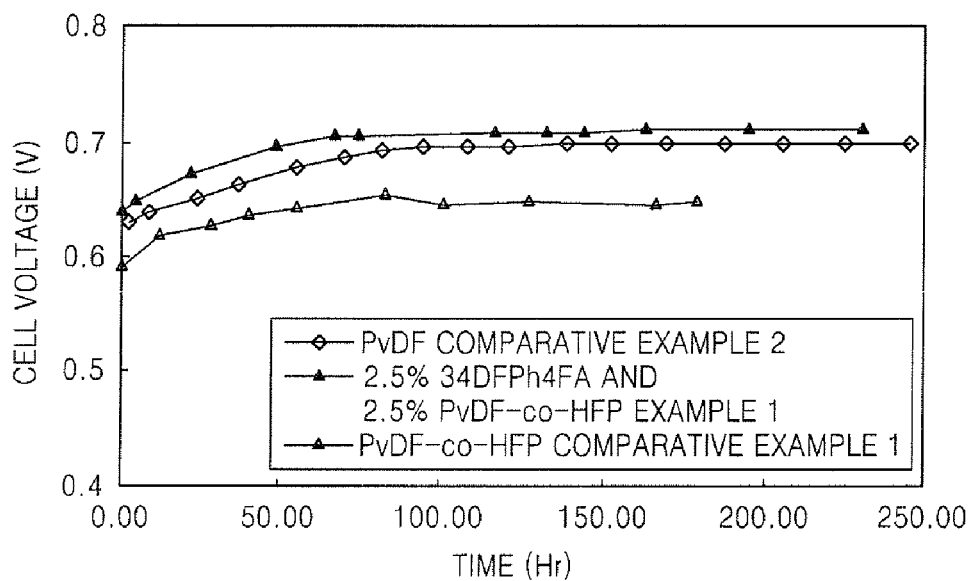
FIG. 1 illustrates changes in cell voltages with respect to operating times, in fuel cells manufactured according to presently taught Example 1 and Comparative Examples 1 and 2.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide an electrode for a fuel cell, the electrode including a catalyst layer which includes a catalyst and at least one selected from the group consisting of: a first benzoxazine monomer represented by Formula 1 below, a second benzoxazine monomer represented by Formula 2 below; a polymer thereof, and a mixture thereof. The polymer can include a homopolymer of the first benzoxazine monomer represented Formula 1, a homopolymer of the second benzoxazine monomer represented by Formula 2, and a copolymer of the first benzoxazine monomer represented by Formula 1 and the second benzoxazine monomer represented by Formula 2.

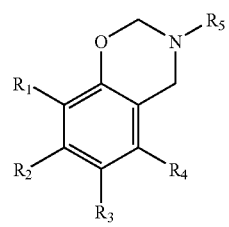

<Formula 1>

In Formula 1:

$R_1$, $R_2$, $R_3$, and $R_4$ are each independently selected from hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, and a cyano group;

$R_5$ is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and at least one selected from $R_1$, $R_2$, $R_3$, $R_4$, and $R_5$ is fluorine or a fluorine-containing functional group, and

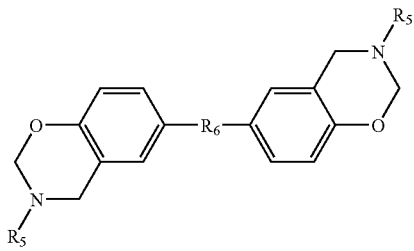

<Formula 2>

In Formula 2:

$R_5$ is selected from a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, and a substituted or unsubstituted C2-C20 heterocyclic alkyl group;

$R_6$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—; and at least one selected of $R_5$ and $R_6$ is fluorine or a fluorine-containing functional group.

In Formula 1, the fluorine-containing functional group is not particularly limited provided that it is a substituent containing fluorine.

An electrode, according to aspects of the present invention, has fluorine or a fluorine-containing functional group incapable of being dissolved in phosphoric acid ($H_3PO_4$) and that causes no catalyst poisoning. The electrode shows good oxygen permeability even when air flows into the electrode (used as a cathode). The electrode can uniformly contain a material with a high hydrophilicity (or good affinity to phosphoric acid), i.e., at least one selected from the group consisting of at least one of a first benzoxazine monomer of Formula 1 and a second benzoxazine monomer of Formula 2, a polymer thereof, and a mixture thereof. The electrode can thereby have an enhanced wettability with phosphoric acid and can exhibit a resistance to heat and phosphoric acid. Phosphoric acid preferentially permeates into micropores of the electrode. Thus, a problem caused when phosphoric acid mainly permeates into macropores of an electrode, i.e., flooding that hinders gas diffusion due to the presence of a large quantity of liquid phosphoric acid in an electrode can be efficiently prevented, thereby increasing gas (fuel gas or oxidizing gas)-liquid (phosphoric acid)-solid (catalyst) interfacial areas.

In aspects of the present invention, the content of at least one of the first benzoxazine monomer of Formula 1 and the second benzoxazine monomer of Formula 2, a polymer thereof, or a mixture thereof, may be 0.001 to 0.5 parts by weight, based on 1 part by weight of the catalyst.

In Formula 1, $R_1$, $R_2$, $R_3$, and $R_4$ may be a C1-C20 alkyl group (e.g.: a methyl group, an ethyl group, a butyl group, a t-butyl group), an allyl group, a C6-C20 aryl group, a C2-C20 alkenyl group, a C2-C20 alkynyl group, fluorine (F), a fluorinated C1-C20 alkyl group, or a fluorinated C6-C20 aryl group.

In Formulae 1 and 2, $R_5$ may be —CH$_2$—CH=CH$_2$, or one of groups represented by the following formulae:

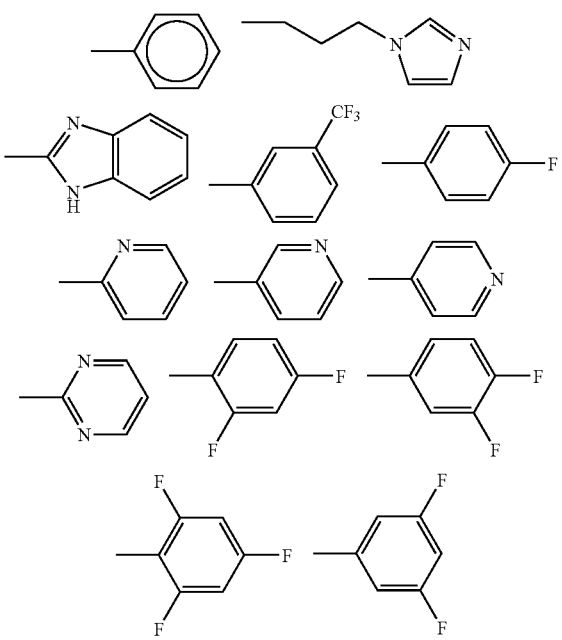

In Formula 2, $R_6$ may be —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, or a group represented by the following formula:

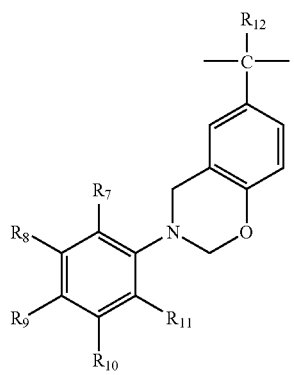

wherein $R_7$, $R_8$, $R_9$, $R_{10}$, and $R_{11}$ are each independently selected from hydrogen, F, CHF$_2$, CH$_2$F, CF$_3$, or a C1-C20 alkyl group, and $R_{12}$ is hydrogen, a methyl group, an ethyl group, a propyl group, F, CHF$_2$, CH$_2$F, or CF$_3$.

The first benzoxazine monomer of Formula 1 may be a compound represented by Formula 3 or 4 below:

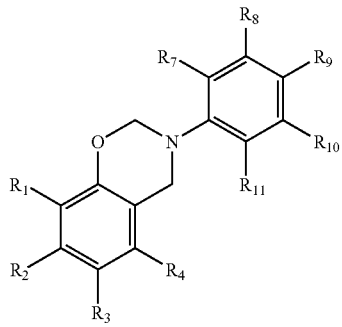
<Formula 3> wherein $R_1$, $R_2$, $R_3$, and $R_4$ are each independently hydrogen, F, $CHF_2$, $CH_2F$, $CF_3$, or a C1-C20 alkyl group;

$R_7$, $R_8$, $R_9$, $R_{10}$, and $R_{11}$ are each independently hydrogen, F, $CHF_2$, $CH_2F$, $CF_3$, or a C1-C20 alkyl group; and at least one of $R_1$, $R_2$, $R_3$, $R_4$, $R_7$, $R_8$, $R_9$, $R_{10}$, and $R_{11}$ is F, $CHF_2$, $CH_2F$, or $CF_3$, or

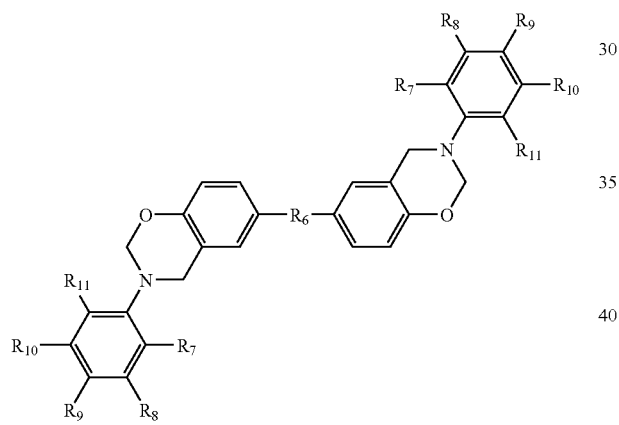
<Formula 4>

In Formula 4:

$R_6$ is $-C(CH_3)_2-$, $CH_2$, $-C(CF_3)_2-$, $-C(CHF_2)_2-$, $-C(CH_2F)_2-$, or a group represented by the following structural formula:

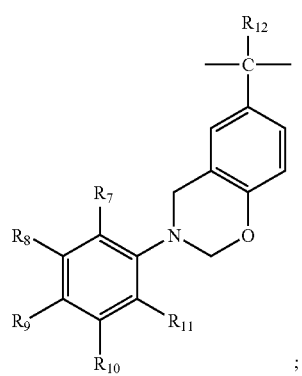

$R_7$, $R_8$, $R_9$, $R_{10}$, and $R_{11}$ are each independently selected from hydrogen, a C1-C20 alkyl group, an allyl group, a C6-C20 aryl group, a t-butyl group, a C2-C20 alkenyl group, a C2-C20 alkynyl group, F, a fluorinated C1-C20 alkyl group (e.g., $CHF_2$, $CH_2F$, $CF_3$), or a fluorinated C6-C20 aryl group, one of $R_7$, $R_8$, $R_9$, $R_{10}$;

$R_{11}$ is F, $CHF_2$, $CH_2F$, or $CF_3$; and $R_{12}$ is hydrogen, a methyl group, an ethyl group, a propyl group, F, $CHF_2$, $CH_2F$, or $CF_3$.

The compound of Formula 3 may be one selected from compounds represented by

Formulae 5 through 21 below:

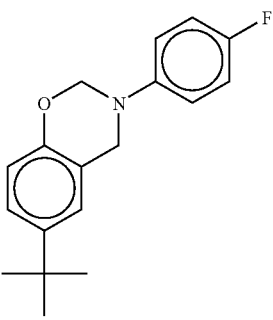
<Formula 5> t-BuPh-4FA

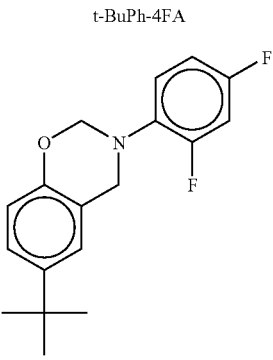
<Formula 6>

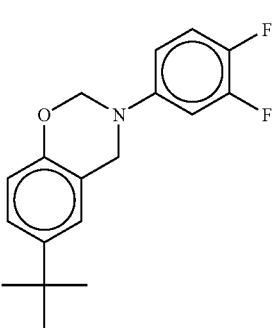
<Formula 7>

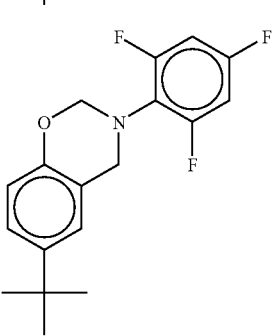
<Formula 8>

<Formula 9>
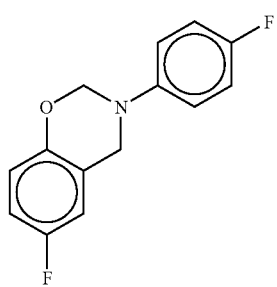
<Formula 10>
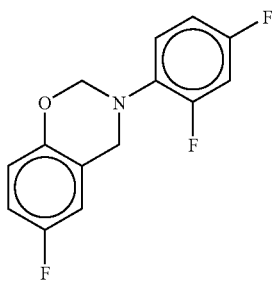
<Formula 11>
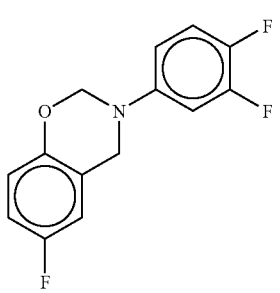
<Formula 12>
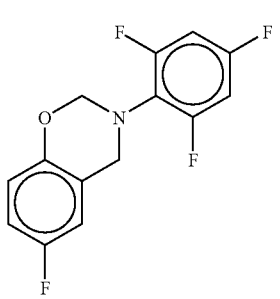
4FPh-2,4,6-TFA
<Formula 13>
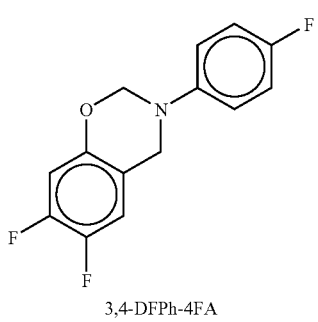
3,4-DFPh-4FA
<Formula 14>
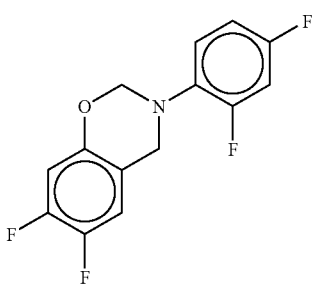
<Formula 15>
<Formula 16>
<Formula 17>
<Formula 18>

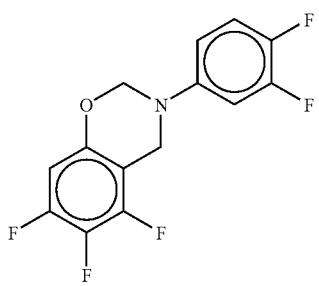
<Formula 19>
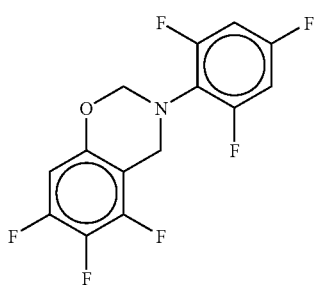
<Formula 20>
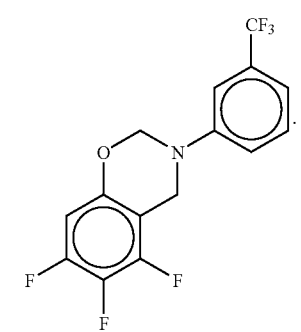
<Formula 21>
The compound of Formula 4 may be one selected from compounds represented by Formulae 22 through 26 below:
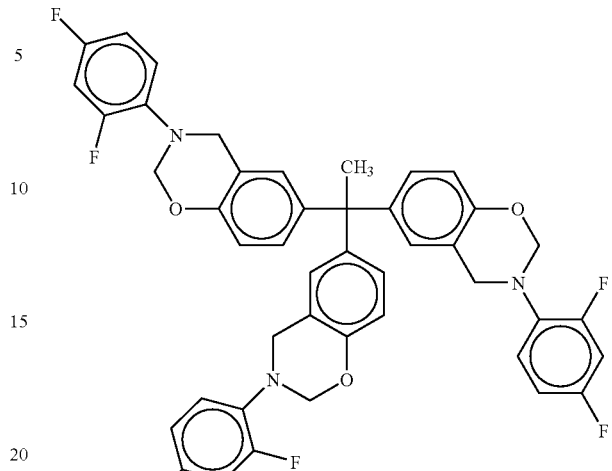
<Formula 23>
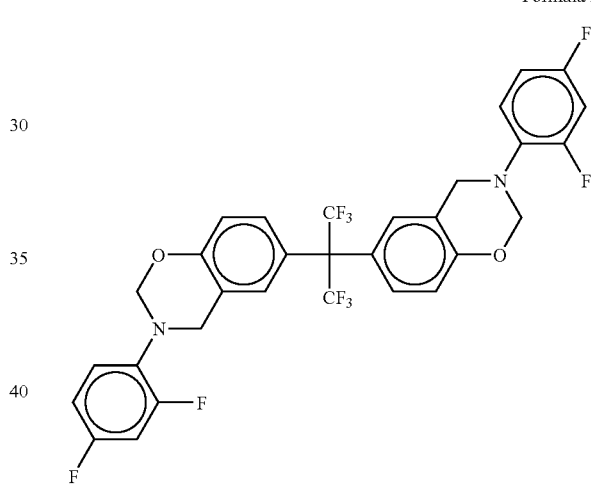
<Formula 24>
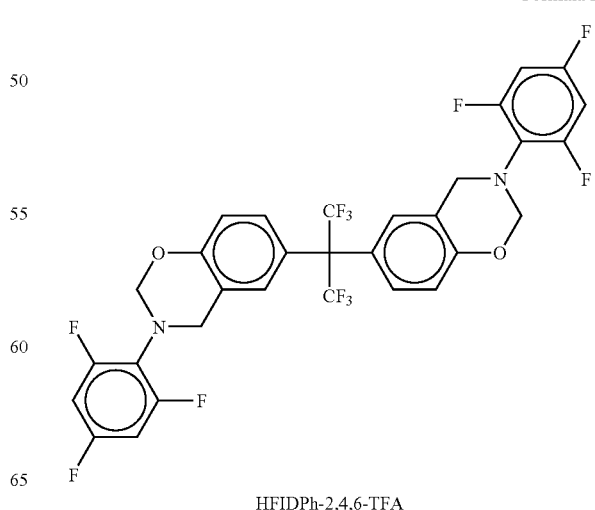
<Formula 22>
<Formula 25>
HFIDPh-2,4,6-TFA -continued <Formula 26>

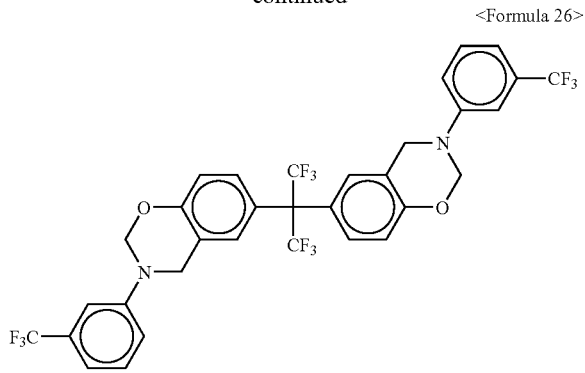

Figure 3:
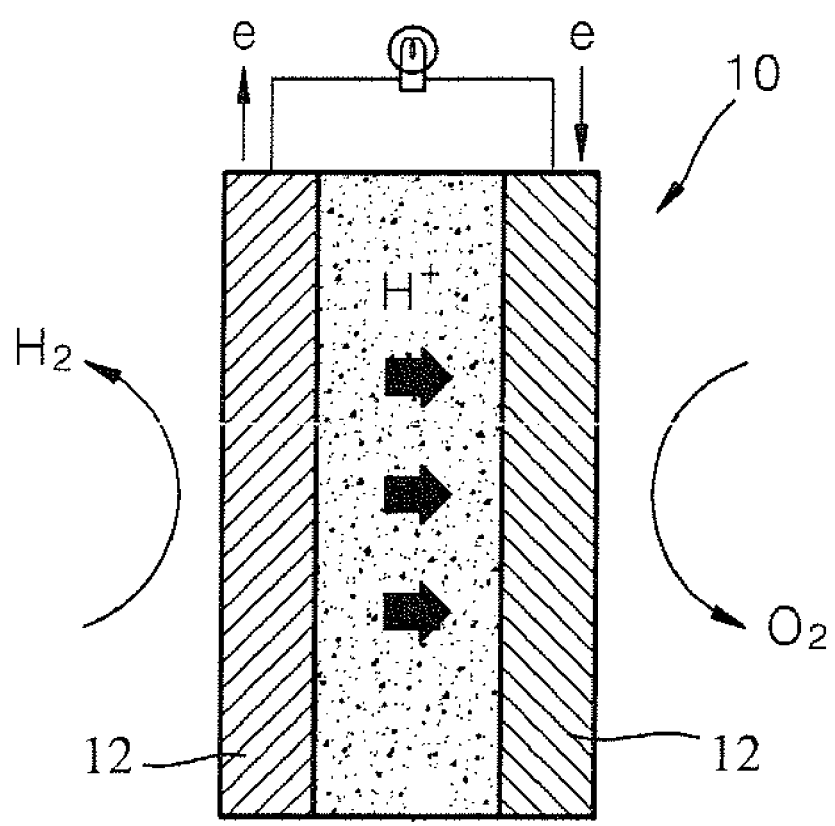
FIG. 3 illustrates a fuel cell including an electrode, according to aspects of the present invention.

FIG. 3 shows a fuel cell 10 including an electrode 12, according to aspects of present invention. The electrode 12 includes a surface coating. The surface coating includes a catalyst in addition to at least one of the first benzoxazine monomer of Formula 1, the second benzoxazine monomer of Formula 2, or a combination thereof. The first and second benzoxazine monomers can be present as homopolymers and/or copolymers.

At least one selected from the group consisting of: the first benzoxazine monomer of Formula 1 and the second benzoxazine monomer of Formula 2; a polymer thereof; and a mixture thereof, is a material enhancing the wettability of the electrode with phosphoric acid, and a content thereof may be from about 0.001 to 0.5 parts by weight, based on 1 part by weight of the catalyst. If the content of at least one selected from the group consisting of the first benzoxazine monomer of Formula 1 and the second benzoxazine monomer of Formula 2, a polymer thereof, and a mixture thereof, is out of the range, an improvement in the wettability of the electrode with phosphoric acid may be insufficient.

A first benzoxazine monomer of Formula 1 can be synthesized by reacting a phenol containing various substituents, an amine, and a p-formaldehyde according to a Reaction Scheme 1 below. The reaction conditions are not particularly limited. According to an exemplary embodiment of the present invention, the reaction may be performed using a melt process in the absence of a solvent. The reaction temperature may be from about 80 to 100° C., but can be varied, according to the particular substituents used.

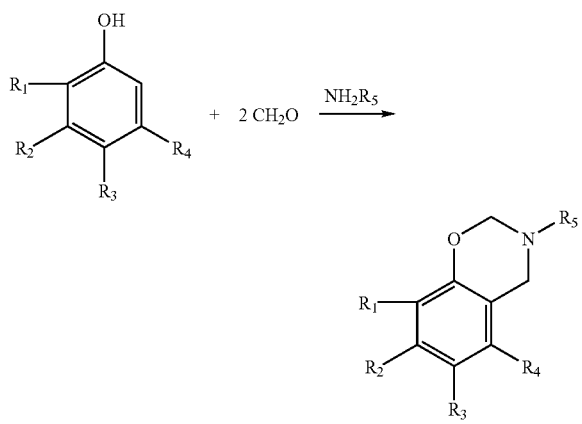

<Reaction Scheme 1> wherein $R_1$ through $R_5$ are as defined in Formula 1.

The second benzoxazine monomer of Formula 2 can be synthesized in a similar manner to the first benzoxazine monomer of Formula 1. The catalyst may be platinum (Pt) alone or an alloy of platinum and at least one selected from the group consisting of gold, palladium, rhodium, iridium, ruthenium, tin, molybdenum, cobalt, and chromium.

An electrode, according to aspects of the present invention, may further include a binder. The binder may be at least one selected from the group consisting of poly(vinylidenefluoride), polytetrafluoroethylene, a tetrafluoroethylene-hexafluoroethylene copolymer, and perfluoroethylene. The content of the binder may be from about 0.001 to 0.5 parts by weight, based on 1 part by weight of the catalyst. If the content of the binder is less than about 0.001 parts by weight, an improvement in the wettability of the electrode with phosphoric acid may be insufficient. If the content of the binder exceeds about 0.5 parts by weight, flooding of phosphoric acid may occur.

A method of manufacturing an electrode for a fuel cell as described above will now be described. First, a catalyst is dispersed in a solvent to obtain a dispersion solution. The dispersion solution can be a colloid. The solvent may be N-methylpyrrolidone (NMP), dimethylacetamide (DMAc), or the like. The content of the solvent may be from about 1 to 10 parts by weight, based on 1 part by weight of the catalyst.

A mixture containing a solvent and at least one of a first benzoxazine monomer of Formula 1 and a second benzoxazine monomer of Formula 2, is added to the dispersion solution and stirred, to obtain a coating solution. A binder may be further added to the coating solution.

The solvent may be NMP, DMAc, or the like. The content of at least one of the first benzoxazine monomer of Formula 1 and the second benzoxazine monomer of Formula 2, may be from about 0.001 to 0.5 parts by weight, based on 1 part by weight of the catalyst. The content of the binder may be from about 0.001 to 0.1 parts by weight, based on 1 part by weight of the catalyst.

The coating solution is coated on a surface of a carbon support, to complete an electrode. Here, for easy coating, the carbon support may be fixedly placed on a glass substrate. The coating method is not particularly limited, but may be doctor blade coating, bar coating, screen printing, or the like.

After coating the coating solution on the surface of the carbon support, the resultant structure is dried at a temperature of from about 20 to 150° C., to remove the solvent. The drying time varies according to the drying temperature, but may be from about 10 to 60 minutes. For example, the drying may be performed at room temperature for one hour, at 60° C. for 15 minutes or more, at 80° C. for 10 minutes or more, and at 120° C. for 10 minutes or more.

An electrode for a fuel cell, according to aspects of the present invention, contains at least one of a first benzoxazine monomer of Formula 1 and a second benzoxazine monomer of Formula 2, a polymer thereof, or a mixture thereof. A polymer is obtained through a polymerization reaction that occurs when a fuel cell is operated at an operating temperature of about 150° C.

A method of manufacturing a fuel cell using an electrode, according to an exemplary embodiment of the present invention, will now be described. An electrolyte membrane that can be used herein is not limited, provided that it is an electrolyte membrane commonly used in fuel cells. For example, a polybenzimidazole electrolyte membrane, a polybenzoxazine-polybenzimidazole copolymer electrolyte membrane, a PTFE porous membrane, or the like may be used.

According to an exemplary embodiment of the present invention, an electrolyte membrane may contain a crosslinked material of a polybenzoxazine compound, which is a polymerization product between a crosslinkable compound and one selected from a third benzoxazine monomer represented by Formula 27 below and a fourth benzoxazine monomer represented by Formula 28 below:

tuted C6-C20 arylene group, a substituted or unsubstituted C2-C20 heteroarylene group, —C(=O)—, and —SO$_2$—.

The compound of Formula 27 may be selected from compounds represented by Formulae 29 through 38 below:

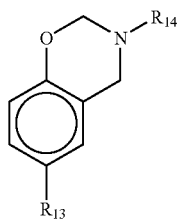

<Formula 27>

In Formula 27:

$R_{13}$ is hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, a substituted or unsubstituted C2-C20 heterocyclic group, a halogen atom, a hydroxy group, or a cyano group; and $R_{14}$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

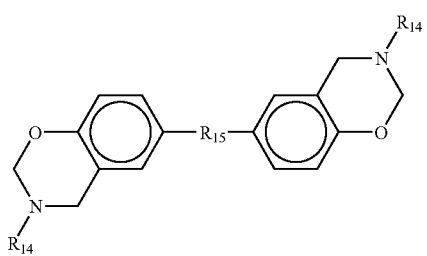

<Formula 28>

In Formula 28:

$R_{14}$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and $R_{15}$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubsti-

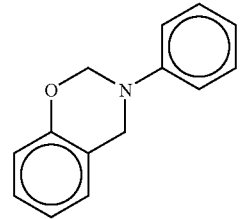

<Formula 29>

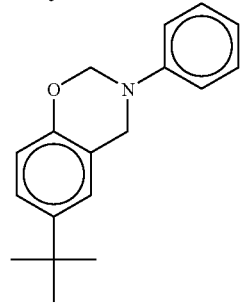

<Formula 30>

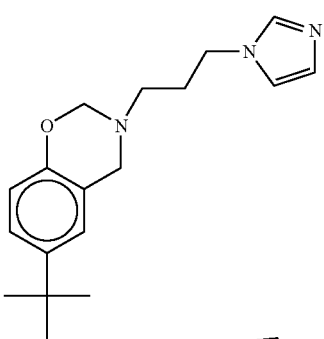

<Formula 31>

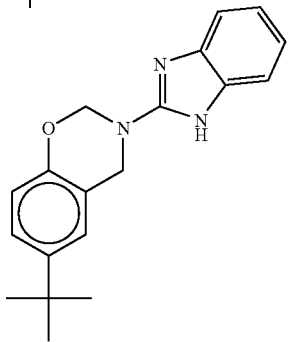

<Formula 32>

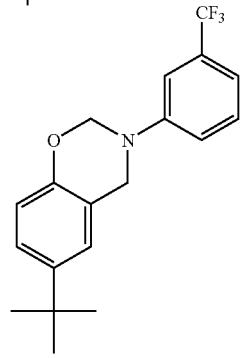

<Formula 33>

-continued
<Formula 34>
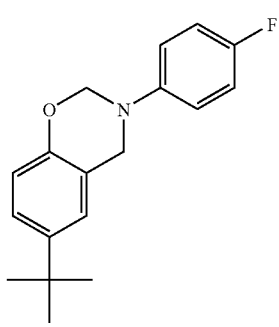
<Formula 35>
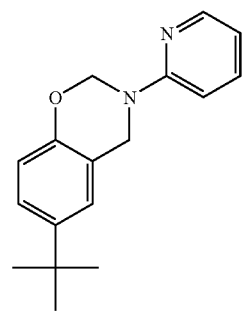
<Formula 36>
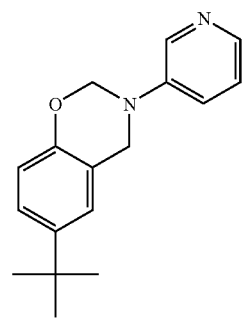
<Formula 37>
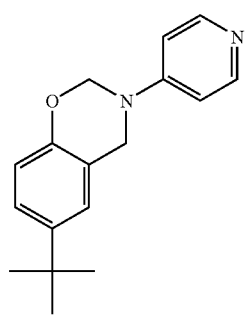
<Formula 38>
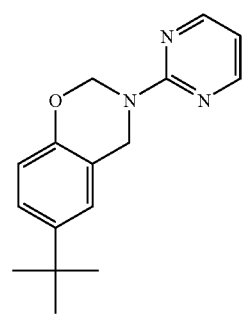
The fourth benzoxazine monomer of Formula 28 may be selected from compounds represented by Formulae 39 through 43 below:
<Formula 39>
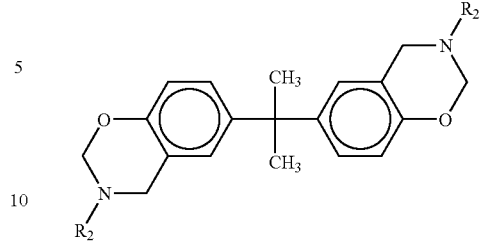
<Formula 40>
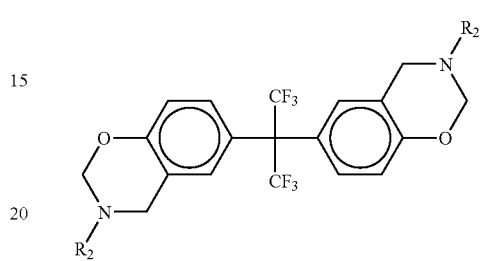
<Formula 41>
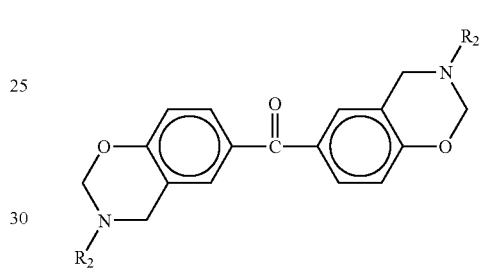
<Formula 42>
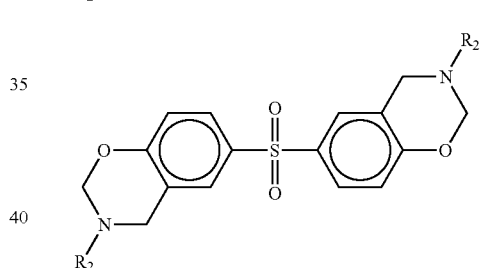
<Formula 43>
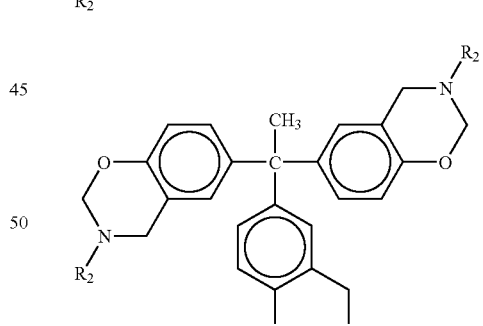
In Formulae 39 through 43, $R_2$ is —$CH_2$—CH=$CH_2$, or a group selected from groups represented by one of the following formulae:
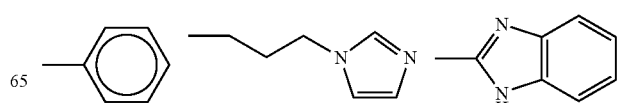

-continued

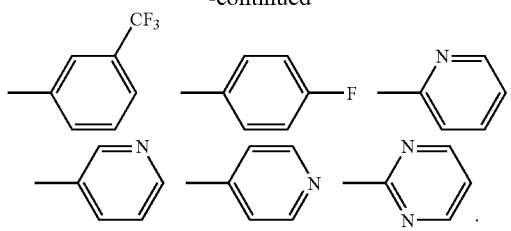

Examples of the crosslinkable compound include, but are not limited to, polybenzimidazoles (PBI), polybenzthiazoles, polybenzoxazoles, and polyimides.

A third benzoxazine monomer of Formula 27, a fourth benzoxazine monomer of Formula 28, and the crosslinkable compound are mixed in a predetermined ratio. Here, the content of the crosslinkable compound may be from about 5 to 95 parts by weight, based on 100 parts by weight of a third benzoxazine monomer of Formula 27 and a fourth benzoxazine monomer of Formula 28.

If the content of the crosslinkable compound is less than about 5 parts by weight, phosphoric acid impregnation may not occur, and a reduced proton conductivity may result. If the content of the crosslinkable compound exceeds about 95 parts by weight, the crosslinked material may be dissolved in polyphosphoric acid, due to a presence of excess phosphoric acid, and may thereby cause gas permeation.

Methods of manufacturing an electrolyte membrane using polybenzimidazole as a crosslinkable compound will now be described.

According to a first method, one of a third benzoxazine monomer of Formula 27 or a fourth benzoxazine monomer of Formula 28, is blended with a crosslinkable compound (e.g., PBI). The resultant blend is cured at about 50 to 250° C., and in particular at about 80 to 220° C., and impregnated with a proton conductor (e.g., an acid), to form an electrolyte membrane.

According to a second method, an electrolyte membrane is formed using a mixture containing one of a third benzoxazine monomer of Formula 27 or a fourth benzoxazine monomer of Formula 28, and a crosslinkable compound (e.g., PBI).

A film formation process for an electrolyte membrane may be performed using tape casting or common coating. For example, when using a coating process, a blend or mixture as described above is cast on a support using a doctor blade. Here, a doctor blade with a gap of from about 250-500 μm may be used.

When forming a film for an electrolyte membrane, by casting using a doctor blade, a separation of the film from a support may be further performed between a curing process and an acid impregnation process. The support on which the film is cast may be immersed in distilled water have a temperature of about 60 to 80° C. The support is not limited, provided that it can support an electrolyte membrane. The support may be a glass substrate, a polyimide film, or the like.

When using a tape casting process, a tape-cast film is separated from a support (e.g., a polyethyleneterephthalate film) before curing and then introduced into an oven, to cure the film. Thus, a support removal process after curing as described above is not required.

When a film for an electrolyte membrane is formed by a tape casting process using a mixture of a benzoxazine monomer and polybenzimidazole, filtration of the mixture may be further performed. The thus-formed film is cured by a heat treatment and impregnated with a proton conductor (e.g., an acid), to complete an electrolyte membrane. Examples of the proton conductor include, but are not limited to, phosphoric acid and a C1-C10 alkylphosphoric acid. The C1-C10 alkylphosphoric acid may be ethylphosphonic acid.

The content of the proton conductor may be from about 300 to 1,000 parts by weight, based on the total weight (100 parts by weight) of the electrolyte membrane. The concentration of the acid is not particularly limited. However, when using a phosphoric acid, an 85 wt % phosphoric acid solution may be used. The impregnation time of the phosphoric acid may be from about 2.5 to 14 hours at about 80° C.

The electrolyte membrane may be used as a hydrogen ion conducting film of a fuel cell. A method of manufacturing a Membrane Electrode Assembly (MEA), for a fuel cell using such an electrolyte membrane, will now be described. As used herein, the term "MEA" refers to a structure where an electrode having a catalyst layer and a diffusion layer is disposed on both surfaces of an electrolyte membrane.

According to an exemplary embodiment of the present invention, in order to manufacture an MEA, electrodes having catalyst layers as described above are respectively disposed on both surfaces of an electrolyte membrane obtained as described above, and incubated under high temperature and high pressure conditions. The electrodes are thereby adhered to both surfaces of the electrolyte membrane, and fuel diffusion layers are then adhered to the electrodes.

The electrodes and the electrolyte membrane are heated to a temperature such that the electrolyte membrane is softened, for adhesion of the membrane. In this state, the structure is pressed under a pressure of about 0.1 to 3 ton/cm², and in particular, at about 1 ton/cm². Bipolar plates are positioned on both sides of the MEA to complete a fuel cell. The bipolar plates can have grooves for fuel supply and can serve as current collectors.

The applications of a fuel cell according to the present invention are not limited. However, a fuel cell may be used as a polymer electrolyte membrane fuel cell.

Definition of substituents used herein will now be described. In the formulae used herein, examples of the unsubstituted C1-C20 alkyl group include methyl, ethyl, propyl, isobutyl, sec-butyl, pentyl, iso-amyl, and hexyl. At least one hydrogen atom of the alkyl group may be substituted by a halogen atom, a halogen atom-substituted C1-C20 alkyl group (e.g., CCF$_3$, CHCF$_2$, CH$_2$F, CCl$_3$, etc.), a hydroxy group, a nitro group, a cyano group, an amino group, an amidino group, hydrazine, hydrazone, a carboxyl group or its salt, a sulfonyl group or its salt, a phosphonyl group or its salt, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, or a C6-C20 heteroarylalkyl group.

Examples of unsubstituted C2-C20 alkenyl groups include vinylene and allylene. At least one hydrogen atom of the alkenyl group may be substituted by the same substituents as those recited in the above definition of the alkyl group. The unsubstituted C2-C20 alkynyl group may be acetylene, etc. At least one hydrogen atom of the alkynyl groups may be substituted by the same substituents as those recited in the above definition of the alkyl group.

Examples of unsubstituted C1-C20 alkylene groups include methylene, ethylene, propylene, isobutylene, sec-butylene, pentylene, iso-amylene, and hexylene. At least one hydrogen atom of the alkylene groups may be substituted by the same substituents as those recited in the above definition of the alkyl group.

The unsubstituted C2-C20 alkenylene groups may be an allyl group, etc. At least one hydrogen atom of the alkenylene group may be substituted by the same substituents as those recited in the above definition of the alkyl group. The unsubstituted C2-C20 alkynylene groups may be an acetylene group, etc. At least one hydrogen atom of the alkynylene group may be substituted by the same substituents as recited in the above definition of the alkyl group.

The aryl group used herein, which can be used alone or in combination, refers to a carbocyclic aromatic system of 6-20 carbon atoms containing one or more rings. The rings may be attached to each other as a pendant group or may be fused. The term "aryl" refers to an aromatic radical such as phenyl, naphthyl, and tetrahydronaphthyl. The aryl group may have a substituent such as a haloalkylene, a nitro, a cyano, an alkoxy, or a lower alkylamino. At least one hydrogen atom of the aryl group may be substituted by the same substituents as recited in the above definition of the alkyl group.

The arylene group, which is used alone or in combination, refers to a carbocyclic aromatic system of 6-20 carbon atoms containing one or more rings. The rings may be attached to each other as a pendant group or may be fused. The term "arylene" refers to an aromatic radical such as a phenylene, a naphthylene, and a tetrahydronaphthylene. The arylene group may have a substituent, such as, a haloalkylene, a nitro, a cyano, an alkoxy, or a lower alkylamino. At least one hydrogen atom of the arylene group may be substituted by the same substituents as recited in the above definition of the alkyl group.

The arylalkyl group used herein refers to an aryl group as defined above, whose hydrogen atoms are partially substituted by a lower alkyl radical, e.g., a methyl, an ethyl, or a propyl. The arylalkyl group may be benzyl, phenylethyl, etc. At least one hydrogen atom of the arylalkyl group may be substituted by the same substituents as recited in the above definition of the alkyl group.

The heteroaryl group used herein refers to a monovalent monocyclic or a bicyclic aromatic compound of 1-20 carbon atoms, containing one, two, or three heteroatoms selected from N, O, P, and S. At least one hydrogen atom of the heteroaryl group may be substituted by the same substituents as recited in the above definition of the alkyl group.

The heteroarylene group used herein refers to a monovalent monocyclic or a bicyclic aromatic compound of 1-20 carbon atoms, containing one, two, or three heteroatoms selected from N, O, P, and S. At least one hydrogen atom of the heteroarylene group may be substituted by the same substituents as recited in the above definition of the alkyl group.

The heteroarylalkyl group used herein refers to a heteroaryl group as defined above having hydrogen atoms that are partially substituted by an alkyl group. At least one hydrogen atom of the heteroarylalkyl group may be substituted by the same substituents as recited in the above definition of the alkyl group.

The carbocyclic group used herein refers to a cyclic group having 5-10 carbon atoms, similar to a cyclohexyl group. At least one hydrogen atom of the carbocyclic group may be substituted by the same substituents as recited in the above definition of the alkyl group.

The carbocyclicalkyl group used herein refers to a carbocyclic group as defined above, having hydrogen atoms that are partially substituted by an alkyl group. At least one hydrogen atom of the carbocyclicalkyl group may be substituted by the same substituents as recited in the above definition of the alkyl group.

The heterocyclic group used herein refers to a cyclic group of 5-20 carbon atoms containing a heteroatom, such as, N, S, P, or O. At least one hydrogen atom of the heterocyclic group may be substituted by the same substituents as recited in the above definition of the alkyl group.

The heterocyclicalkyl group used herein refers to a heterocyclic group as defined above, having hydrogen atoms that are partially substituted by an alkyl group. At least one hydrogen atom of the heterocyclicalkyl group may be substituted by the same substituents as recited in the above definition of the alkyl group.

Hereinafter, aspects of the present invention will be described more specifically, with reference to the following working examples. The following working examples are for illustrative purposes only and are not intended to limit the scope of the invention.

Example 1

Manufacture of Electrodes for Fuel Cells and Fuel Cells Employing the Electrodes 1 g of a PtCo(TEC36E52) catalyst (50 wt % on carbon) and 3 g of NMP used as a solvent were introduced into a stirring vessel. The reaction mixture was stirred using a mortar to make a slurries. A 10 wt % solution of a compound of Formula 13 (3,4-DFPh-4FA) in NMP was added to the slurries, to produce 0.026 g of a compound of Formula 13 was, followed by stirring.

Next, a solution of 5 wt % of a vinylidenefluoride-co-hexafluoropropylene copolymer in NMP was added to the mixture, to produce 0.026 g of the vinylidenefluoride-co-hexafluoropropylene copolymer, followed by mixing for 10 minutes, to make slurries for cathode catalyst layers.

Carbon papers were cut into 4×7 cm$^2$ pieces and fixed on glass plates.

The slurries for the cathode catalyst layers were coated on the carbon papers, using a doctor blade (Sheen Instrument) with a gap of 600 μm, and dried at room temperature for one hour, at 80° C. for one hour, at 120° C. for 30 minutes, and at 150° C. for 15 minutes to form cathodes (fuel electrodes). The loading amount of PtCo in the cathodes was 3.0 mg/cm$^2$.

Anodes were manufactured as follows. 2 g of a Pt catalyst (50 wt % on carbon) and 9 g of NMP (used as a solvent) were introduced into a stirring vessel. The reaction mixture was stirred using a high-speed stirrer for two minutes. Then, a solution of 0.005 g of polyvinylidenefluoride in 1 g of NMP was added to the reaction solution, followed by stirring for two minutes, to make slurries for anode catalyst layers. The slurries for the anode catalyst layers were coated on carbon papers having microporous layers, using a bar coater. The loading amount of platinum in anodes was 1.4 mg/cm$^2$.

Meanwhile, 65 parts by weight of a benzoxazine monomer of Formula 27 and 35 parts by weight of polybenzimidazole were blended, and the blend was cured at 80 to 220° C. Then, the cured product was impregnated with 85 wt % phosphoric acid, at 80° C. for about four hours to form electrolyte membranes. Here, the content of the phosphoric acid was about 500 parts by weight, based on the total weight (100 parts by weight) of each electrolyte membrane.

The electrolyte membranes were inserted between the cathodes and the anodes to manufacture MEAs. Here, the cathodes and the anodes were not impregnated with phosphoric acid.

In order to prevent gas permeation between the cathodes and the anodes, a stack of a 200 μm Teflon film, used as a major gasket, and a 20 μm Teflon film, used as a sub-gasket, were disposed at an interface between each electrode and each electrolyte membrane. The pressure applied to the MEAs was adjusted using a torque wrench, and was increased in a stepwise fashion, using 1, 2, and 3 N-m Torque wrenches.

Electric power was produced at 150° C., under non-humidified electrolyte membrane conditions, by passing hydrogen (flow rate: 100 ccm) through the anodes and air (flow rate: 250 ccm) through the cathodes. The cell characteristics were then evaluated. Since the phosphoric acid-doped electrolyte membranes were used, the performance of the fuel cells was enhanced over time. The cell characteristics were evaluated after aging, until an operating voltage reached a peak value. The area of each of the cathodes and the anodes was set to 2.8×2.8=7.84 cm². The cathodes were about 430 μm thick and the anodes were about 390 μm thick.

Example 2

Manufacture of Electrodes for Fuel Cells and Fuel Cells Employing the Electrodes Fuel cells were manufactured in the same manner as in Example 1, except that the 4FPh-2,4,6-TFA of Formula 12 was used, instead of the 3,4-DFPh-4FA of Formula 13, to manufacture cathodes. Here, the loading amount of PtCo in each of the cathodes was 2.5 mg/cm².

Example 3

Manufacture of Electrodes for Fuel Cells and Fuel Cells Employing the Electrodes Fuel cells were manufactured in the same manner as in Example 1, except that the HFIDPh-2,4,6-TFA of Formula 25 was used, instead of the 3,4-DFPh-4FA of Formula 13, to manufacture cathodes. Here, the loading amount of PtCo in each of the cathodes was 2.5 mg/cm².

Example 4

Manufacture of Electrodes for Fuel Cells and Fuel Cells Employing the Electrodes Fuel cells were manufactured in the same manner as in Example 1, except that the t-BuPh-4FA of Formula 5 was used, instead of 3,4-DFPh-4FA of Formula 13, to manufacture cathodes. Here, the loading amount of PtCo in each of the cathodes was 2.5 mg/cm².

Comparative Example 1

Manufacture of Electrodes for Fuel Cells and Fuel Cells Employing the Electrodes Fuel cells were manufactured in the same manner as in Example 1, except that cathodes were manufactured in the absence of the 3,4-DFPh-4FA of Formula 13. The loading amount of PtCo in each of the cathodes was 3.0 mg/cm², and the loading amount of platinum in each of anodes was 1.4 mg/cm².

Comparative Example 2

Manufacture of Electrodes for Fuel Cells and Fuel Cells Employing the Electrodes Fuel cells were manufactured in the same manner as in Example 1, except that cathodes were manufactured in the absence of the 3,4-DFPh-4FA of Formula 13, using polyvinylidenefluoride instead of a vinylidenefluoride-co-hexafluoropropylene copolymer. Here, the loading amount of PtCo in each of the cathodes was 3.0 mg/cm², and the loading amount OT platinum in each of the anodes was 1.4 mg/cm².

In the fuel cells manufactured in Example 1 and Comparative Examples 1 and 2, a change in cell voltage, with respect to an operating time, was measured, and the results are illustrated in FIG. 1. Referring to FIG. 1, the voltage characteristics of the fuel cells manufactured in Example 1 were improved as compared to those of the fuel cells manufactured in Comparative Examples 1 and 2, over the same operating time.

Figure 2:
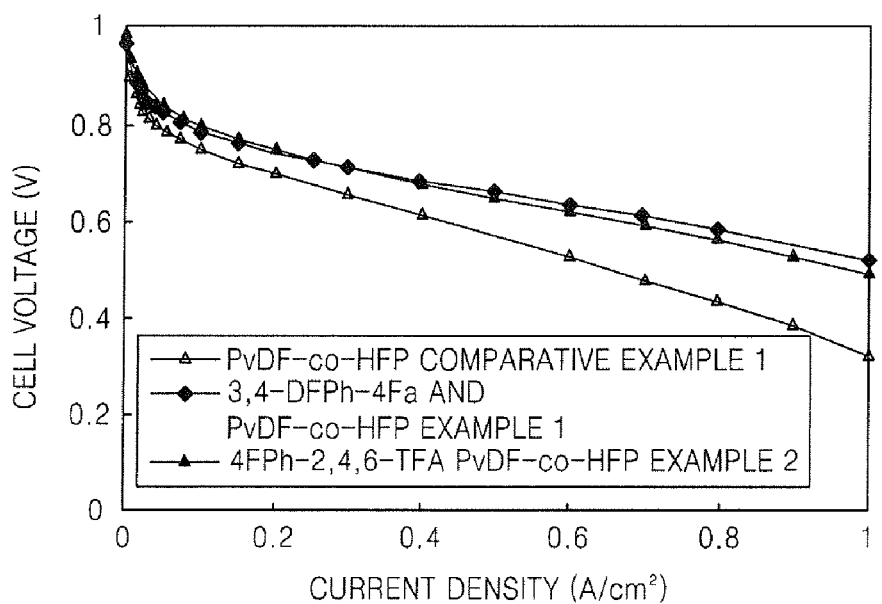
FIG. 2 illustrates changes in cell potentials with respect to current densities, in fuel cells manufactured according to presently taught Examples 1 and 2 and Comparative Example 1.

In the fuel cells manufactured in Examples 1 and 2 and Comparative Example 1, a change in cell potential with respect to current density was measured, and the results are illustrated in FIG. 2. Referring to FIG. 2, the fuel cells manufactured in Examples 1 and 2 exhibited a better MEA performance than the fuel cells manufactured in Comparative Example 1. These results show that the use of an additive, to enhance the wettability of an electrode with phosphoric acid, enables a uniform distribution of phosphoric acid in micropores of the electrode, and thus, increases a gas-liquid-solid interfacial area, thereby enhancing cell performance.

Evaluation Example 1

Evaluation of Cell Performance

In order to analyze the cause of performance improvement of the fuel cells, Tafel fitting was performed in a V-log I curve, to determine the slope and the y-intercept (see Equation 1 below). The y-intercept related to exchange current density increases in the presence of an additive. PBI reference electrodes and PTFE electrodes are distinctly different in the slope related to reaction mechanism, and thus, this difference in the slopes is indicative of a change in reaction mechanism.

$$Tafel\ intercept = f(C_{02})$$ < Equation 1 >

$$\eta = \boxed{\frac{2.3RT}{\alpha nF}\log i_0} - \frac{2.3RT}{\alpha nF}\log i$$

$$i_0 = nF c_{O2} * k_{OC}\exp(-\alpha_C nF E_{edpm}/RT)$$

According to Equation 1, the Tafel intercept is changed, according to the exchange current density $i_o$. Here, $i_o$ is determined by an oxygen concentration. When comparing the Tafel intercepts of additive-containing electrodes and additive-free electrodes, a change in oxygen concentration in the vicinity of a catalyst can be predicted.

In the fuel cells manufactured in Examples 1-4 and Comparative Example 1, Tafel fitting was performed and the results are summarized in Table 1 below.

TABLE 1

| | Active Pt area ($cm^2Pt/cm^2$) | Tafel intercept I | $O_2$ overvoltage (mV) | Voltage at 0.3 A/cm² (V) |
|---|---|---|---|---|
| Standard (Comparative Example 1) (2.5% PvDF-co-HFP) | 279 | 0.674 | 25 | 0.656 |
| 2.5% 3,5 DFPh-4FA 2.5% PvDF-co-HFP (Example 1) | 182 | 0.693 | 11 | 0.712 |
| 2.5% 4FPh-2,4,6-TFA 2.5% PvDF-co-HFP | 273 | 0.699 | 16 | 0.713 |

TABLE 1-continued

| | Active Pt area ($cm^2Pt/cm^2$) | Tafel intercept I | $O_2$ over-voltage (mV) | Voltage at 0.3 $A/cm^2$ (V) |
|---|---|---|---|---|
| (Example 2) 2.5% HFIDPh-2,4,6-TFA 2.5% PvDF-co-HFP (Example 3) | 486 | 0.688 | 22 | 0.705 |
| 2.5% t-BuPh-4FA 2.5% PvDF-co-HFP (Example 4) | 243 | 0.697 | 17 | 0.687 |

The percentage (%) in Table 1 refers to a wt % used to indicate the content of each component in a catalyst layer. Referring to Table 1, with respect to the y-intercepts of the Tafel lines, indicating an oxygen concentration near platinum, the y intercepts of the electrodes of the fuel cells of Examples 1-4 were higher than those of the reference electrodes of the fuel cells of Comparative Example 1. With respect to an oxygen over-voltage, caused by resistance against oxygen migration, the oxygen over-voltages of the electrodes of the fuel cells of Examples 1-4 were lower than those of the reference electrodes of the fuel cells of Comparative Example 1.

These results show that an oxygen concentration increased in the electrodes of Examples 1-4, thereby resulting in a lower oxygen over-voltage and a higher oxygen reduction reaction, as compared to the electrodes of Comparative Example 1.

An electrode for a fuel cell, according to aspects of the present invention, contains fluorine or a fluorine-containing functional group. Thus, the electrode shows better oxygen permeability, even when air flows to a cathode, an enhancement in the wettability of the electrode with phosphoric acid ($H_3PO_4$), and excellent heat resistance. Therefore, a fuel cell employing the electrode can be operated under high temperature and non-humidified conditions and can improve power output performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode for a fuel cell, the electrode comprising a catalyst layer comprising a catalyst and at least one selected from the group consisting of a first benzoxazine monomer represented by Formula 1 below and a second benzoxazine monomer represented by Formula 2 below, a polymer thereof, and a mixture thereof;

wherein Formula 1 is

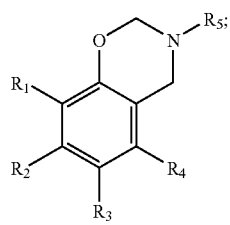

wherein:
$R_1$, $R_2$, $R_3$, and $R_4$ are each independently hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, or a substituted or unsubstituted C2-C20 heterocyclic group, a halogen atom, a hydroxy group, and a cyano group;

$R_5$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and at least one of $R_1$, $R_2$, $R_3$, $R_4$, and $R_5$ is fluorine or a fluorine-containing functional group, and wherein Formula 2 is

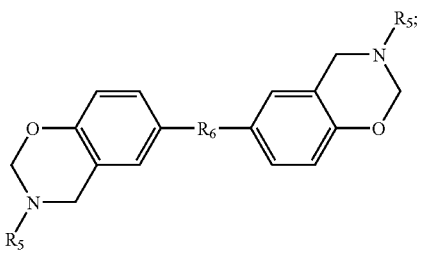

wherein:
$R_5$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, and a substituted or unsubstituted C2-C20 heterocyclic alkyl group;

$R_6$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —$SO_2$—; and at least one of $R_5$ and $R_6$ is fluorine or a fluorine-containing functional group.

2. The electrode of claim 1, wherein in Formula 1, $R_1$, $R_2$, $R_3$, and $R_4$ are selected from the group consisting of a C1-C20 alkyl group, an allyl group, a C6-C20 aryl group, a C2-C20 alkenyl group, a C2-C20 alkynyl group, fluorine (F), a fluorinated C1-C20 alkyl group, and a fluorinated C6-C20 aryl group.

3. The electrode of claim 1, wherein in Formulae 1 and 2, $R_5$ is —CH$_2$—CH=CH$_2$, or one of groups represented by the following formulae:

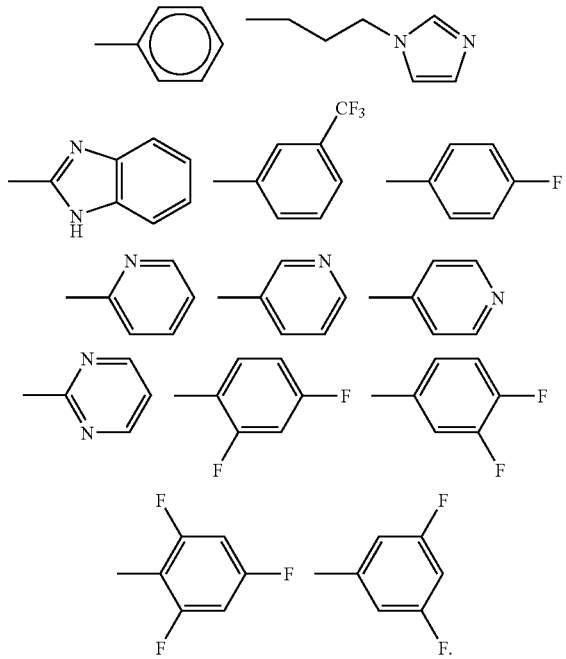

4. The electrode of claim 1, wherein in Formula 2, $R_6$ is selected from the group consisting of —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, and a group represented by the following structural formula:

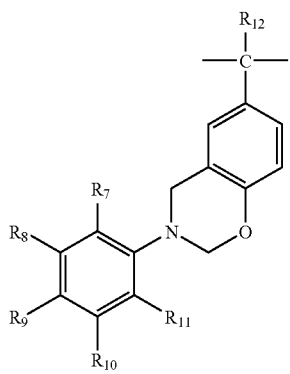

wherein, $R_7$, $R_8$, $R_9$, $R_{10}$, and $R_{11}$ are each independently selected from the group consisting of hydrogen, a C1-C20 alkyl group, an allyl group, a C6-C20 aryl group, a t-butyl group, a C2-C20 alkenyl group, a C2-C20 alkynyl group, F, a fluorinated C1-C20 alkyl group, and a fluorinated C6-C20 aryl group, and $R_{12}$ is selected from the group consisting of hydrogen, a methyl group, an ethyl group, a propyl group, F, CHF$_2$, CH$_2$F, and CF$_3$.

5. The electrode of claim 1, wherein the first benzoxazine monomer of Formula 1 is a compound represented by Formula 3 below:

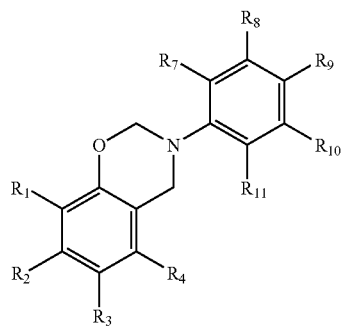

<Formula 3> wherein, $R_1$, $R_2$, $R_3$, and $R_4$ are each independently selected from the group consisting of hydrogen, F, CHF$_2$, CH$_2$F, CF$_3$, and a C1-C20 alkyl group, $R_7$, $R_8$, $R_9$, $R_{10}$, and $R_{11}$ are each independently selected from the group consisting of hydrogen, F, CHF$_2$, CH$_2$F, CF$_3$, and a C1-C20 alkyl group, and at least one of $R_1$, $R_2$, $R_3$, $R_4$, $R_7$, $R_8$, $R_9$, $R_{10}$, and $R_{11}$ is F, CHF$_2$, CH$_2$F, or CF$_3$.

6. The electrode of claim 5, wherein the compound of Formula 3 is one selected from compounds represented by Formulae 5 through 21 below:

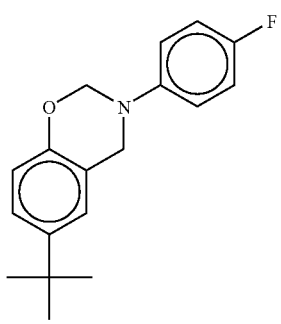

<Formula 5>

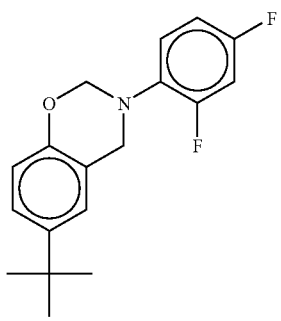

<Formula 6>

<Formula 7>

<Formula 8>

<Formula 9>

<Formula 10>

<Formula 11>

<Formula 12>

<Formula 13>

<Formula 14>

<Formula 15>

<Formula 16>

-continued

<Formula 17>
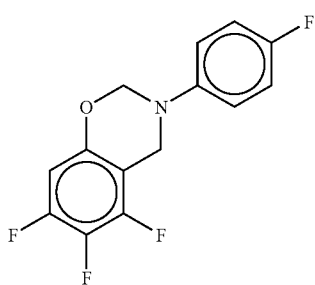

<Formula 18>
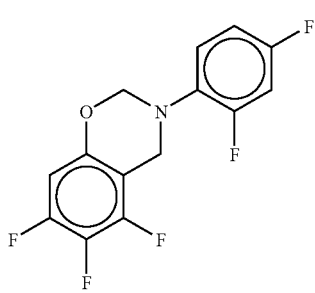

<Formula 19>
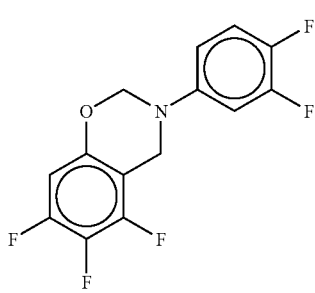

<Formula 20>
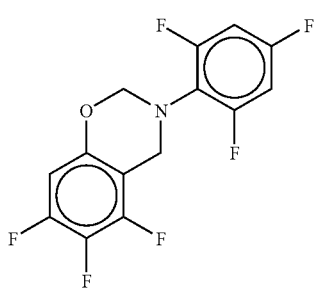

<Formula 21>
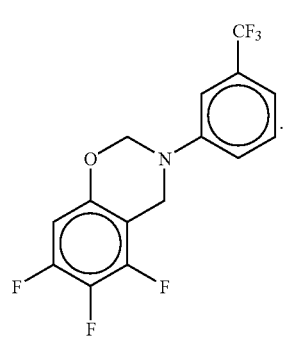

7. The electrode of claim 1, wherein the second benzoxazine monomer of Formula 2 is a compound represented by Formula 4 below:

<Formula 4>
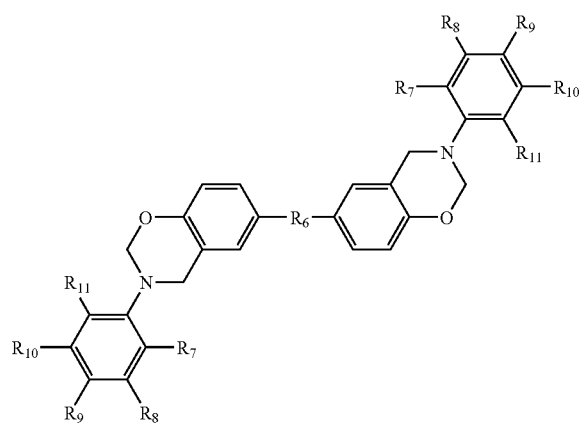

wherein, $R_6$ is —C(CH$_3$)$_2$—, CH$_2$, —C(CF$_3$)$_2$—, —C(CHF$_2$)$_2$—, —C(CH$_2$F)$_2$—, or a group represented by the following structural formula:

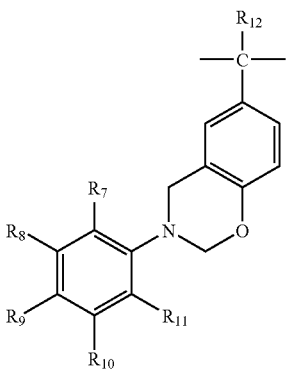

wherein:

$R_7$, $R_8$, $R_9$, $R_{10}$, and $R_{11}$ are each independently selected from the group consisting of hydrogen, a C1-C20 alkyl group, an allyl group, a C6-C20 aryl group, a t-butyl group, a C2-C20 alkenyl group, a C2-C20 alkynyl group, F, a fluorinated C1-C20 alkyl group, and a fluorinated C6-C20 aryl group;

$R_{12}$ is hydrogen, a methyl group, an ethyl group, a propyl group, F, CHF$_2$, CH$_2$F, or CF$_3$, and one of $R_7$, $R_8$, $R_9$, $R_{10}$, and $R_{11}$ is F, CHF$_2$, CH$_2$F, or CF$_3$.

8. The electrode of claim 7, wherein the compound of Formula 4 is selected from compounds represented by Formulae 22 through 26 below:

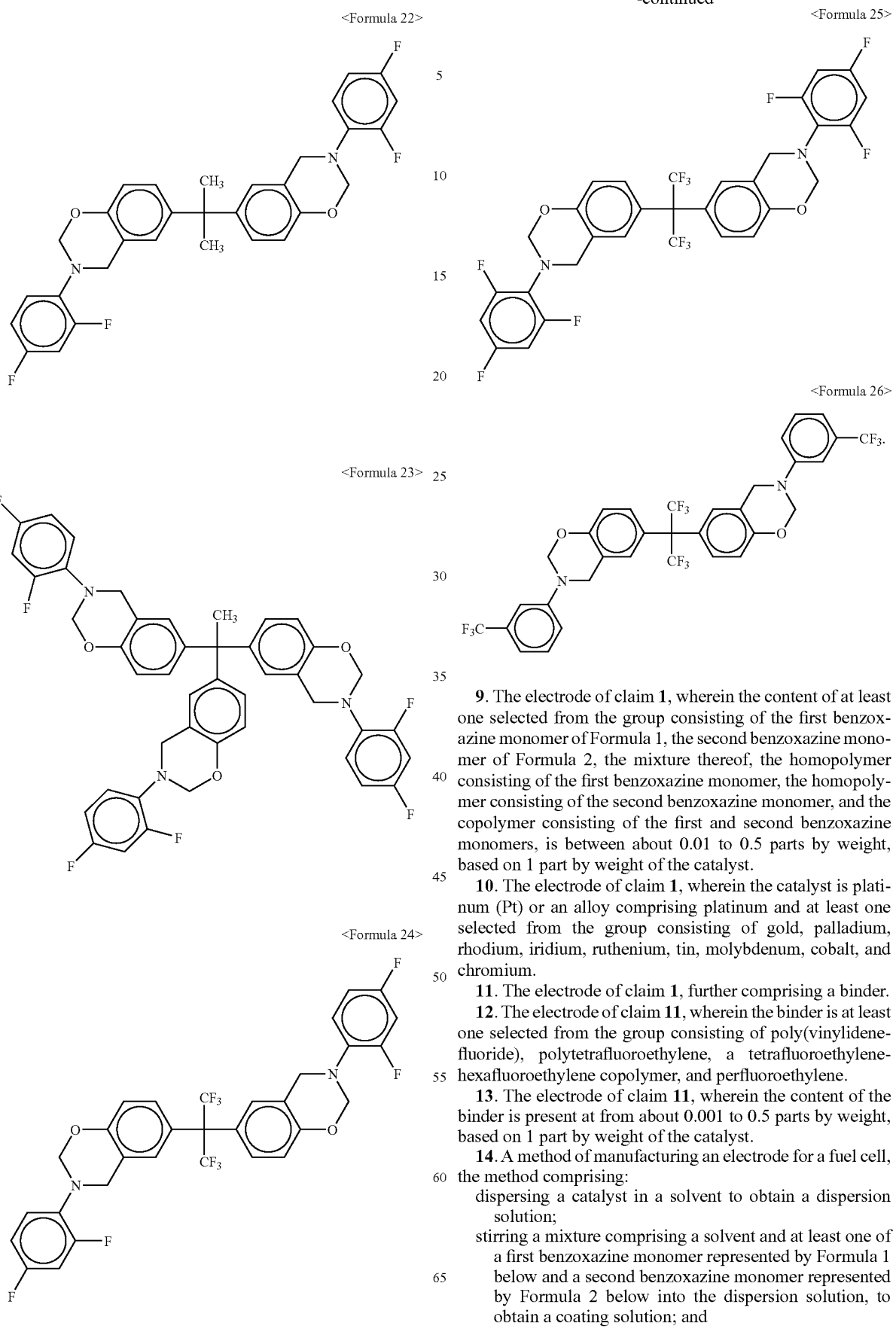

9. The electrode of claim 1, wherein the content of at least one selected from the group consisting of the first benzoxazine monomer of Formula 1, the second benzoxazine monomer of Formula 2, the mixture thereof, the homopolymer consisting of the first benzoxazine monomer, the homopolymer consisting of the second benzoxazine monomer, and the copolymer consisting of the first and second benzoxazine monomers, is between about 0.01 to 0.5 parts by weight, based on 1 part by weight of the catalyst.

10. The electrode of claim 1, wherein the catalyst is platinum (Pt) or an alloy comprising platinum and at least one selected from the group consisting of gold, palladium, rhodium, iridium, ruthenium, tin, molybdenum, cobalt, and chromium.

11. The electrode of claim 1, further comprising a binder.

12. The electrode of claim 11, wherein the binder is at least one selected from the group consisting of poly(vinylidenefluoride), polytetrafluoroethylene, a tetrafluoroethylene-hexafluoroethylene copolymer, and perfluoroethylene.

13. The electrode of claim 11, wherein the content of the binder is present at from about 0.001 to 0.5 parts by weight, based on 1 part by weight of the catalyst.

14. A method of manufacturing an electrode for a fuel cell, the method comprising:
dispersing a catalyst in a solvent to obtain a dispersion solution;
stirring a mixture comprising a solvent and at least one of a first benzoxazine monomer represented by Formula 1 below and a second benzoxazine monomer represented by Formula 2 below into the dispersion solution, to obtain a coating solution; and coating the coating solution on a surface of a carbon support:

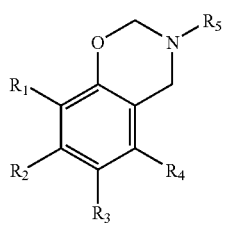

<Formula 1> wherein:

$R_1$, $R_2$, $R_3$, and $R_4$ are each independently hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, or a substituted or unsubstituted C2-C20 heterocyclic group, a halogen atom, a hydroxy group, or a cyano group;

$R_5$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and at least one of $R_1$, $R_2$, $R_3$, $R_4$, and $R_5$ is fluorine or a fluorine-containing functional group, and

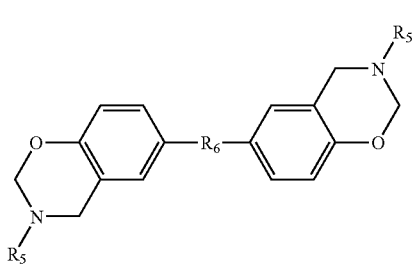

<Formula 2> wherein:

$R_5$ is a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group;

$R_6$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—; and at least one selected from $R_5$ and $R_6$ is fluorine or a fluorine-containing functional group.

15. The method of claim 14, further comprising adding a binder to the coating solution.

16. A fuel cell comprising an electrode for a fuel cell, the electrode comprising a catalyst layer comprising a catalyst and at least one selected from the group consisting of a first benzoxazine monomer represented by a Formula 1 below, a second benzoxazine monomer represented by a Formula 2 below, a polymer thereof, and a mixture thereof wherein Formula 1 is

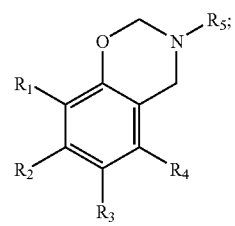

wherein:

$R_1$, $R_2$, $R_3$, and $R_4$ are each independently selected from the group consisting of hydrogen, a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C2-C20 heteroaryl group, a substituted or unsubstituted C4-C20 cycloalkyl group, or a substituted or unsubstituted C2-C20 heterocyclic group, a halogen atom, a hydroxy group, and a cyano group;

$R_5$ is selected from the group consisting of a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and at least one of $R_1$, $R_2$, $R_3$, $R_4$, and $R_5$ is fluorine or a fluorine-containing functional group, and wherein Formula 2 is

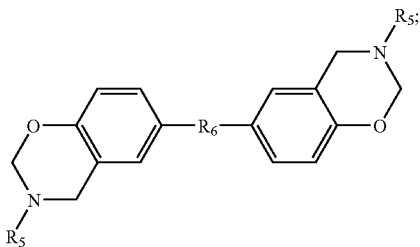

wherein:
- $R_5$ is selected from the group consisting of a substituted or unsubstituted C1-C20 alkyl group, a substituted or unsubstituted C2-C20 alkenyl group, a substituted or unsubstituted C2-C20 alkynyl group, a substituted or unsubstituted C6-C20 aryl group, a substituted or unsubstituted C7-C20 arylalkyl group, a substituted or unsubstituted C2-C20 heteroaryl group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, and a substituted or unsubstituted C2-C20 heterocyclic alkyl group;
- $R_6$ is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—; and
- at least one of $R_5$ and $R_6$ is fluorine or a fluorine-containing functional group.

17. A fuel cell of claim 16, wherein in Formula 1, $R_1$, $R_2$, $R_3$, and $R_4$ are selected from the group consisting of a C1-C20 alkyl group, an allyl group, a C6-C20 aryl group, a C2-C20 alkenyl group, a C2-C20 alkynyl group, fluorine (F), a fluorinated C1-C20 alkyl group, and a fluorinated C6-C20 aryl group.

18. A fuel cell of claim 16, wherein in Formulae 1 and 2, $R_5$ is —CH$_2$—CH=CH$_2$, or one of groups represented by the following formulae:

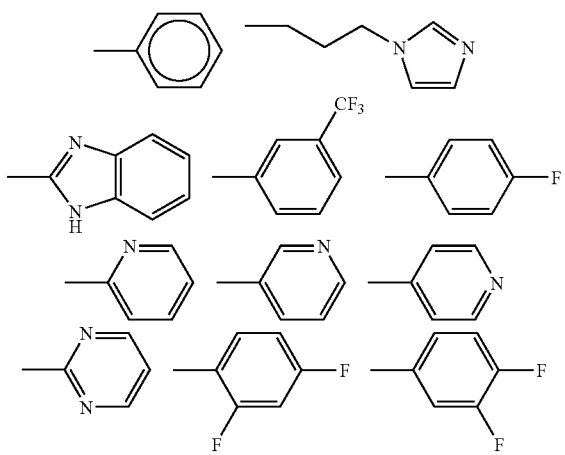

-continued

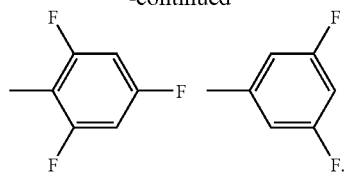

19. A fuel cell of claim 16, wherein in Formula 2, $R_6$ is selected from the group consisting of —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, and a group represented by the following structural formula:

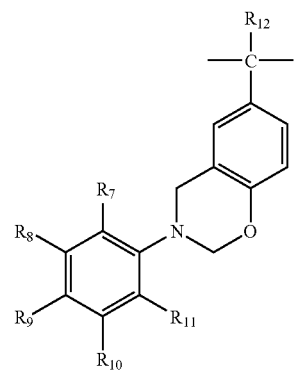

wherein,
- $R_7$, $R_8$, $R_9$, $R_{10}$, and $R_{11}$ are each independently selected from the group consisting of hydrogen, a C1-C20 alkyl group, an allyl group, a C6-C20 aryl group, a t-butyl group, a C2-C20 alkenyl group, a C2-C20 alkynyl group, F, a fluorinated C1-C20 alkyl group, and a fluorinated C6-C20 aryl group, and
- $R_{12}$ is selected from the group consisting of hydrogen, a methyl group, an ethyl group, a propyl group, F, CHF$_2$, CH$_2$F, and CF$_3$.

20. A fuel cell of claim 16, wherein the first benzoxazine monomer of Formula 1 is a compound represented by Formula 3 below:

<Formula 3>

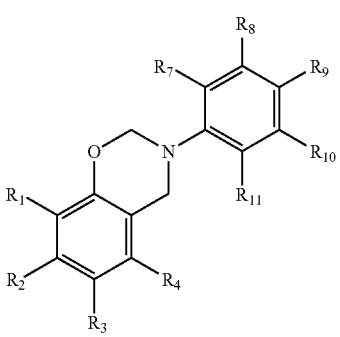

wherein,
- $R_1$, $R_2$, $R_3$, and $R_4$ are each independently selected from the group consisting of hydrogen, F, CHF$_2$, CH$_2$F, CF$_3$, and a C1-C20 alkyl group,
- $R_7$, $R_8$, $R_9$, $R_{10}$, and $R_{11}$ are each independently selected from the group consisting of hydrogen, F, CHF$_2$, CH$_2$F, CF$_3$, and a C1-C20 alkyl group, and
- at least one of $R_1$, $R_2$, $R_3$, $R_4$, $R_7$, $R_8$, $R_9$, $R_{10}$, and $R_{11}$ is F, CHF$_2$, CH$_2$F, or CF$_3$.

* * * * *